United States Patent
Park et al.

(10) Patent No.: US 9,088,531 B2
(45) Date of Patent: *Jul. 21, 2015

(54) INTERWORKING METHOD AND SYSTEM IN CONVERGED IP MESSAGING SERVICE

(71) Applicant: Samsung Electronics Co., Ltd., Gyeonggi-do (KR)

(72) Inventors: Sung-Jin Park, Gyeonggi-do (KR); Kyung-Tak Lee, Gyeonggi-do (KR); Seung-Yong Lee, Seoul (KR); Jae-Kwon Oh, Seoul (KR); Ji-Hye Lee, Seoul (KR); Wuk Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,927

(22) Filed: Dec. 17, 2013

(65) Prior Publication Data

US 2014/0108577 A1    Apr. 17, 2014

Related U.S. Application Data

(63) Continuation of application No. 12/867,464, filed as application No. PCT/KR2009/000715 on Feb. 13, 2009, now Pat. No. 8,626,850.

(30) Foreign Application Priority Data

Feb. 13, 2008 (KR) .................. 10-2008-0013237
Mar. 31, 2008 (KR) .................. 10-2008-0030059

(51) Int. Cl.
*G06F 15/16* (2006.01)
*H04L 12/58* (2006.01)
(Continued)

(52) U.S. Cl.
CPC .............. *H04L 51/00* (2013.01); *H04L 51/066* (2013.01); *H04L 51/36* (2013.01); *H04L 67/24* (2013.01); *H04W 4/18* (2013.01); *H04L 51/38* (2013.01); *H04W 92/02* (2013.01)

(58) Field of Classification Search
CPC ....... H04L 51/00; H04L 51/066; H04L 51/36; H04L 51/38; H04L 67/24; H04W 4/18; H04W 92/02
USPC ......... 709/206–207, 201–203, 223, 225, 230, 709/218, 219; 455/466; 370/466
See application file for complete search history.

(56) References Cited

U.S. PATENT DOCUMENTS 7,606,190 B2   10/2009  Markovic et al.
7,743,131 B2    6/2010  Brendes et al.

(Continued)

FOREIGN PATENT DOCUMENTS

CN   101072386   11/2007
EP   1 473 949   11/2004

(Continued)

OTHER PUBLICATIONS

PCT/ISA/237 Written Opinion issued in PCT/KR2009/000715 (10pp).

(Continued)

*Primary Examiner* — Alina N Boutah
(74) *Attorney, Agent, or Firm* — The Farrell Law Firm, P.C.

(57) ABSTRACT

An apparatus and method are provided for performing interworking between different messaging services in a Converged Internet Protocol (IP) Messaging (CPM) service. The method includes receiving, by a CPM server, a message generated based on a user input from an arbitrary terminal; requesting, by the CPM server, a presence server to provide presence information corresponding to a recipient of the message; receiving, from the presence server, the presence information that is transmitted in response to the request; deciding a type of a messaging service for interworking based on the presence information; and delivering, by the CPM server, the message to an Interworking Function (IWF) that converts the message according to the decided type of the messaging service.

28 Claims, 5 Drawing Sheets

(51) Int. Cl.
*H04W 4/18* (2009.01)
*H04L 29/08* (2006.01)
*H04W 92/02* (2009.01)

(56) References Cited

U.S. PATENT DOCUMENTS

| | | | |
|---|---|---|---|
| 7,984,130 B2* | 7/2011 | Bogineni et al. | 709/223 |
| 8,010,616 B2 | 8/2011 | Lee et al. | |
| 8,224,928 B2 | 7/2012 | Brendes et al. | |
| 8,392,580 B2 | 3/2013 | Allen et al. | |
| 2001/0049730 A1* | 12/2001 | Brendes et al. | 709/223 |
| 2005/0213537 A1 | 9/2005 | Ingimundarson et al. | |
| 2007/0249379 A1 | 10/2007 | Bantukul | |
| 2008/0004010 A1* | 1/2008 | Boberg et al. | 455/435.1 |
| 2008/0056235 A1* | 3/2008 | Albina et al. | 370/352 |
| 2008/0086564 A1* | 4/2008 | Putman et al. | 709/227 |
| 2008/0113679 A1* | 5/2008 | Sung et al. | 455/466 |
| 2008/0123686 A1* | 5/2008 | Lee et al. | 370/466 |
| 2008/0256117 A1 | 10/2008 | Laurila et al. | |
| 2008/0281931 A1 | 11/2008 | Oh et al. | |
| 2009/0029697 A1 | 1/2009 | Bianconi et al. | |
| 2009/0067408 A1 | 3/2009 | Leppainen et al. | |
| 2009/0067417 A1 | 3/2009 | Kalavade et al. | |
| 2009/0077181 A1* | 3/2009 | Chen | 709/206 |
| 2009/0080404 A1* | 3/2009 | Laurila et al. | 370/348 |
| 2009/0193069 A1* | 7/2009 | Alexander et al. | 709/203 |
| 2010/0049846 A1* | 2/2010 | Ballette et al. | 709/224 |
| 2010/0074181 A1 | 3/2010 | Markovic et al. | |
| 2011/0060805 A1 | 3/2011 | Lee et al. | |
| 2011/0182243 A1 | 7/2011 | Gallagher et al. | |

FOREIGN PATENT DOCUMENTS

| | | |
|---|---|---|
| KR | 1020070077716 | 7/2007 |
| KR | 1020070741287 | 7/2007 |
| WO | WO 03/103308 | 12/2003 |
| WO | WO 2005048626 | 5/2005 |

OTHER PUBLICATIONS

Ann McLaughlin, Comverse, "Converged Messaging Over IMS/IP", CDG EV-DO Rev A Applications Tech Forum, Nov. 9, 2006.
Open Mobile Alliance, Converged IP Messaging Requirements, Draft Version 1.0, OMA-RD-CPM-V1_0-20061218-D, Dec. 18, 2006.
European Search Report dated Dec. 4, 2014 issued in counterpart application No. 09711111.6-1853.

* cited by examiner

INTERWORKING METHOD AND SYSTEM IN CONVERGED IP MESSAGING SERVICE

PRIORITY

This application is a Continuation of U.S. Ser. No. 12/867,464, which was filed in the U.S. Patent and Trademark Office on Aug. 12, 2010, as a National Stage entry of PCT/KR2009/000715, and claims priority under to Korean Patent Application Nos. 10-2008-0013237 and 10-2008-0030059, which were filed in the Korean Intellectual Property Office on Feb. 13, 2008 and Mar. 31, 2008, respectively, the content of each of which is incorporated herein by reference.

BACKGROUND OF THE INVENTION

1. Field of the Invention

The present invention relates generally to a converged IP messaging service, and more particularly, to an interworking method and system between a converged IP messaging service and other messaging services.

2. Description of the Related Art

Commonly used messaging services include Short Message Service (SMS), Multimedia Messaging System (MMS), Email Service, Instant Messaging (IM) Service, etc. Although these messaging services are provided based on different technologies, they overlap one another in many aspects in the light of user experiences. For example, all of these messaging services can send text messages, and the services other than SMS can also send multimedia content.

Considering the overlapping of the user experiences, Open Mobile Alliance (OMA) has recently defined a new service called Converged IP Messaging service (CPM service) based on a Session Initiation Protocol (SIP) and an Internet Protocol (IP). The CPM service is aimed to provide key features of the existing messaging services in a single messaging service. Accordingly, by simply using the CPM service, a user can experience the user services that all the existing messaging services have provided, and can also exchange messages with users of all the existing messaging services.

A schematic configuration of a system supporting the CPM service is shown in FIG. 1. Referring to FIG. 1, the CPM system includes a CPM client 10, an Interworking Function (IWF) 20, a message/media storage 30, a converged address book 40, a user preference storage 50, a CPM server 60, and a SIP/IP core network 70.

The CPM client 10 is generally included in a terminal, and provides interfacing between a CPM service and a user. In other words, the CPM client 10 serves to handle requests of the user. For example, if the user creates content and requests delivery of the content, the CPM client 10 converts this content to be suitable to the CPM service, includes the converted content in a SIP MESSAGE, and sends the SIP MESSAGE to the SIP/IP core network 70. Also, the CPM client 10 receives content sent from another client, determines and verifies whether the content has been correctly received, and if so, delivers the received content to the user. Thus, the CPM client 10 may be considered as a contact point between the user and the CPM service.

The CPM server 60 is a server that handles the requirements the CPM client 10 sends through a CPM conversion interface. The CPM server 60 applies the policy set by the service provider or the user to the CPM contents provided from the CPM client 10.

The IWF 20 converts CPM content and provides it to another messaging service so that the message content delivered by a sending CPM client, i.e., the CPM content, may be processed by another messaging service other than the CPM service. Also, upon receiving content of another messaging service, the IWF 20 converts a format of the content so that the content may be processed by the CPM service. This operation of the IWF 20 is called interworking. The IWF 20 is connected to the CPM server 60 through a CPM-IW interface, and connected to other messaging services through interfaces provided by those messaging services.

The message/media storage 30 serves to store messages delivered to the user in the absence of the user or depending on user's settings. The converged address book 40, a kind of phonebook, includes a contact list and serves to insert presence information into information about each contact and provide the contact information to the user.

The SIP/IP core network 70, a low-level network supporting necessary SIP and IP, exists between all of the above-described components and is responsible for routing all messages. An example of the SIP/IP core network 70 includes an IP Multimedia Subsystem (IMS).

SUMMARY OF THE INVENTION

The CPM service provides a messaging service by interworking with the existing messaging services. Accordingly, in a CPM service environment, a sender sends CPM content without consideration of a type of the messaging service to which a recipient has subscribed, or recipient's preference. In addition, the CPM service should be able to interwork with the existing messaging services such as SMS, MMS, Email, IM, PoC, etc. in order to most successfully deliver the message sent by the sender to the recipient regardless of the types of the messaging services used by the recipient. Herein, the term "interworking" may be construed to include providing a routing mechanism so that a CPM message may be delivered to the existing messaging service desired by the user, and performing conversion between a CPM message format and a message format of the existing messaging service.

There are two factors to consider in the interworking of the CPM service. First, upon receiving a CPM message from the CPM client 10, the CPM server 60 should decide on interworking by determining whether a recipient of the CPM message is a CPM message user or a user of another messaging service. Second, if the CPM server 60 has decided to perform interworking as the recipient is a user of another messaging service, the CPM server 60 should determine through which messaging service it will deliver the CPM message. After the two factors are considered, routing should be performed through a mechanism provided based on the consideration, to ensure full interworking in the CPM service.

Accordingly, an aspect of the present invention is to provide a method and system for performing interworking taking into account the presence/absence of a user's interworking request and a type of a messaging service through which interworking will be performed.

In accordance with an aspect of the present invention, a method for performing interworking between different messaging services in a CPM service is provided. The method includes receiving, by a CPM server, a message generated based on a user input from an arbitrary terminal; requesting, by the CPM server, a presence server to provide presence information corresponding to a recipient of the message; receiving, from the presence server, the presence information that is transmitted in response to the request; deciding a type of a messaging service for interworking based on the presence information; and delivering, by the CPM server, the message to an IWF that converts the message according to the decided type of the messaging service.

In accordance with another aspect of the present invention, a CPM server is provided for performing interworking between different messaging services in a CPM service. The CPM server includes a transceiver for transmitting and receiving messages; and a controller for receiving a message generated based on a user input from an arbitrary terminal via the transceiver, requesting a presence server to provide presence information corresponding to a recipient of the message, receiving the presence information that is transmitted from the presence server in response to the request via the transceiver, deciding a type of a messaging service for interworking based on the presence information, and delivering, via the transceiver, the message to an IWF that converts the message according to the decided type of the messaging service.

In accordance with another aspect of the present invention, a method for exchanging messages between different messaging services in a CPM service is provided. The method includes generating, by a terminal, presence information of the terminal; transmitting, by the terminal, the presence information to a presence server; and receiving, by the terminal, a converted message from an IWF. The converted message is converted at the IWF based on a type of messaging service selected according to the presence information.

In accordance with another aspect of the present invention, a terminal is provided for exchanging messages between different messaging services in a CPM service. The terminal includes a transceiver for transmitting and receiving messages; and a controller for generating presence information of the terminal, transmitting the presence information to a presence server via the transceiver, and receiving a converted message from an IWF, via the transceiver. The converted message is converted at the IWF based on a type of messaging service selected according to the presence information.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
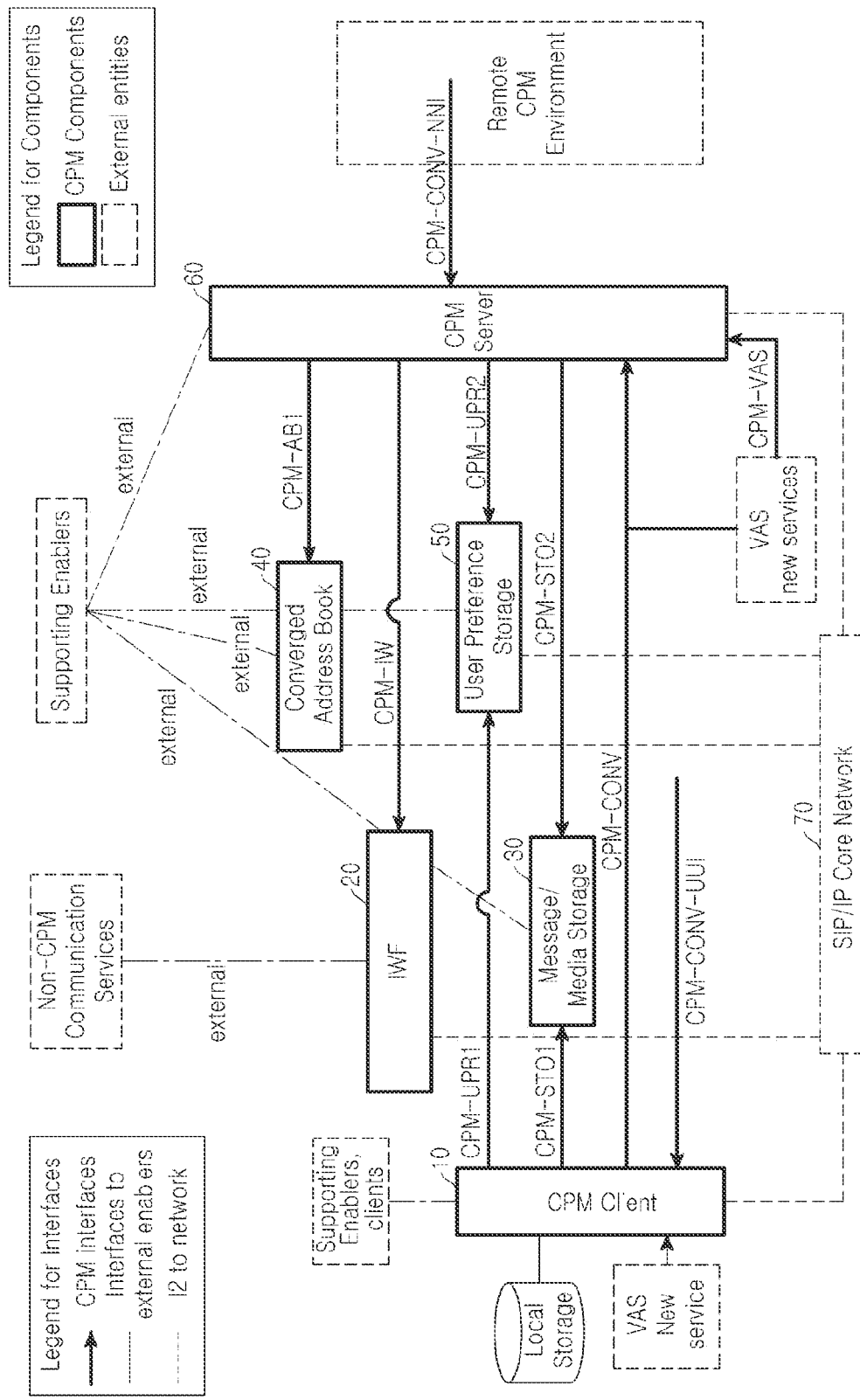
FIG. 1 is a diagram showing a configuration of a general CPM system.
Figure 2:
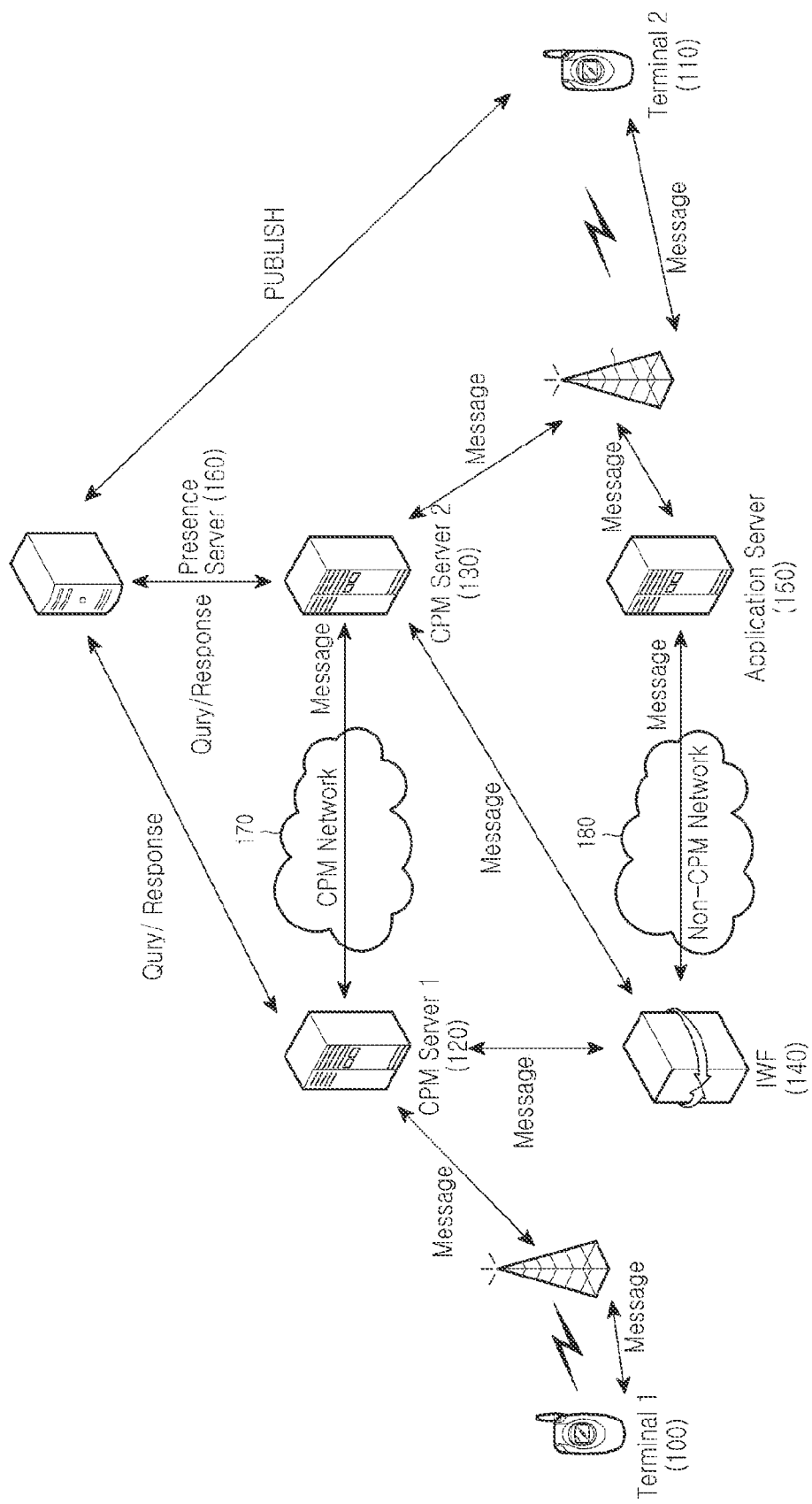
FIG. 2 is a diagram showing a configuration of an interworking system according to an embodiment of the present invention.

First, a configuration of a system supporting CPM interworking between a CPM service and another messaging service according to an embodiment of the present invention will be described with reference to FIG. 2. As shown in FIG. 2, the system supporting CPM interworking includes terminals 100 and 110, CPM servers 120 and 130, an IWF 140, an application server 150, a presence server 160, a CPM network 170, and a non-CPM network 180. The first terminal 100 and the second terminal 110 each include one of a presence client capable of providing a presence source, and a CPM client or a client supporting another messaging service. A user provides a necessary function in which through a terminal, a presence client generates presence information and registers it in the presence server 160. In an embodiment of the present invention, it is assumed that both the first terminal 100 and the second terminal 110 include a presence client and a CPM client. In addition, a terminal including a CPM client is called a CPM terminal.

Upon receiving a CPM message from a CPM terminal, the CPM servers 120 and 130 request the presence server 160 to provide presence information corresponding to a recipient of the CPM message. Based on the received presence information, the CPM servers 120 and 130 decide whether to perform an interworking function, and a type of a messaging service through which they will perform interworking (hereinafter referred to as a "messaging service for interworking").

The presence server 160 stores presence information corresponding to a user of each messaging service. The presence information is registered by the user, and includes a type of a messaging service supportable to the user, and a user preference. The user preference information includes a user's interworking grant and a type of a messaging service for interworking. The presence server 160 provides presence information of a user in response to a presence information request from any one of the CPM servers 120 and 130, an Interworking Selection Function (ISF, not shown) which is an independent server for an interworking selector 125 in the presence server 160, and the IWF 140.

The IWF 140 converts formats of messages to be exchanged between different messaging services.

The CPM network 170 delivers CPM messages, while the non-CPM network 180 delivers messages based on messaging services other than the CPM service, for example, messages based on a PoC service, an IM service, an Email service, an MMS service and an SMS service. The application server 150 means a server providing the PoC service, the IM service, the Email service, the MMS service, the SMS service, etc.

In the aforementioned system, when a CPM message is transmitted, an interworking process according to an embodiment of the present invention is performed as follows. The interworking process includes a step in which a CPM user or a user using another messaging service stores, in the presence server 160, presence information including the type of an available messaging service(s) and the user preference, a step in which a CPM terminal generates a message and transmits it to the first CPM server 120 over the SIP/IP core network, a step (Query) in which the first CPM server 120 requests the presence server 160 to provide presence information corresponding to a recipient of the message, a step (Response) in which the presence server 160 provides the requested presence information in response to the request of the first CPM server 120, a step in which based on the presence information, the first CPM server 120 decides whether to perform interworking, a step in which based on the presence information, the first CPM server 120 decides a type of a supportable messaging service, a step in which the first CPM server 120 routes the message to the IWF 140 according to the decided type of the messaging service, a step in which the IWF 140 converts the message into a message format of the decided messaging service, a step in which if the decided messaging service is the CPM service, the message is delivered to the second CPM server 130 in the receiving side over the CPM network or a step in which if the decided messaging service is not the CPM service, the message is delivered to the application server 150 supporting the decided messaging service over the non-CPM network, and a step in which the second CPM server 130 and the application server 150 finally deliver the message to the user.

Figure 3:
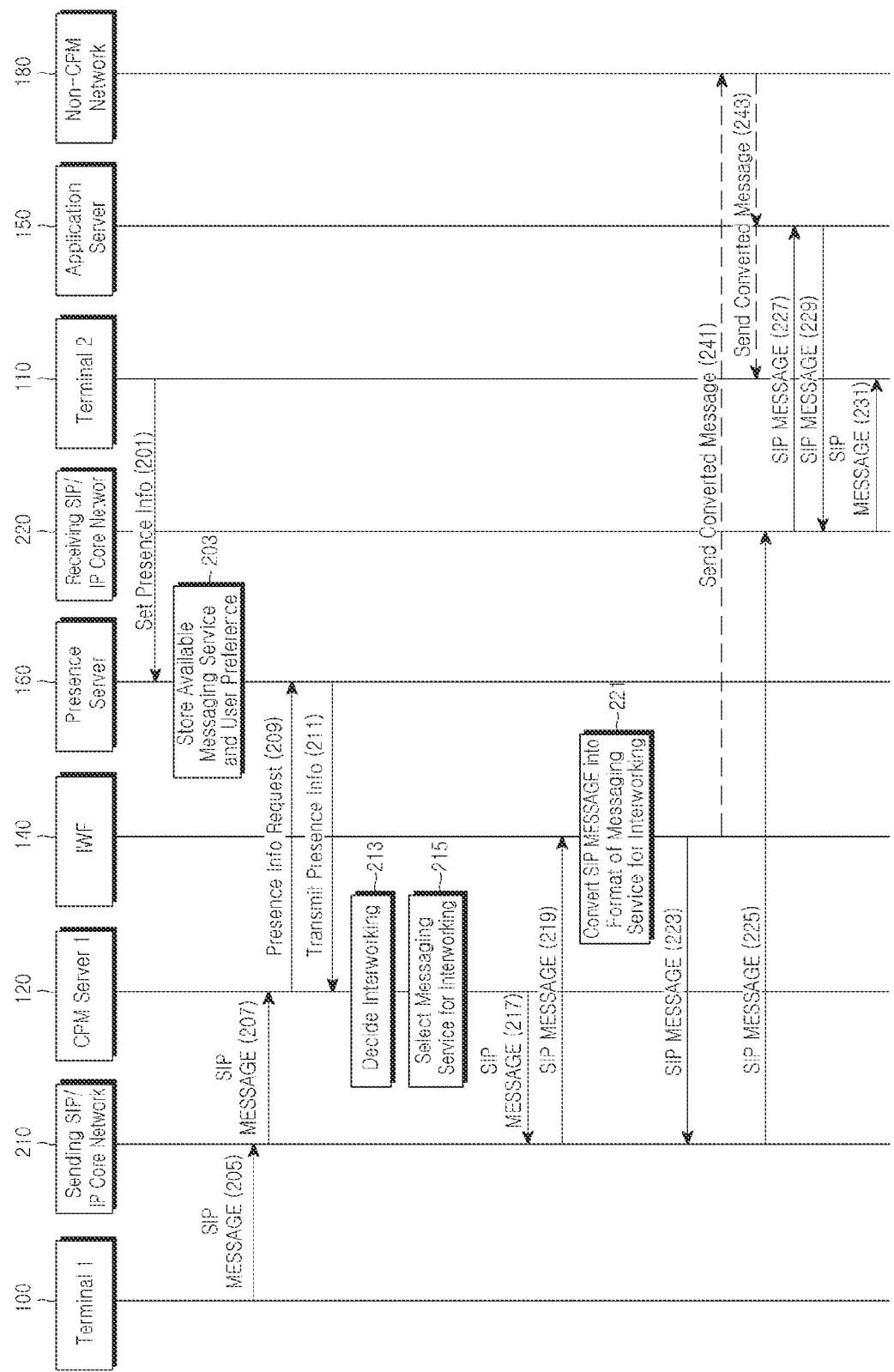
FIG. 3 is a diagram showing an interworking process according to an embodiment of the present invention.

Reference will now be made to FIGS. 2 and 3 to give a detailed description of each step in the interworking process of the CPM service, and possible modifications thereof In FIG. 3, a user of the second terminal 110 registers presence information in the presence server 160 using a presence client in the second terminal 110 in step 201. In an embodiment of the present invention, the presence server 160 is assumed as a Session Initiation Protocol for instant Message and Presence Leveraging Extensions (SIMPLE) presence server using the SIP/IP core network. Accordingly, the second terminal 110 stores its presence information in the presence server 160 using SIP PUBLISH, and the presence information may be created based on the syntax defined in OMA Presence. An example of the presence information is shown in Table 1.

TABLE 1

```
<?xml version="1.0" encoding="UTF-8"?>
<presence xmlns="urn:ietf:params:xml:ns:pidf"
   xmlns:pdm="urn:ietf:params:xml:ns:pidf:data-model"
   xmlns:rpid="urn:ietf:params:xml:ns:pidf:rpid"
   xmlns:op="urn:oma:xml:prs:pidf:oma-pres"
   xmlns:gp="urn:ietf:params:xml:ns:pidf:geopriv10"
   xmlns:cl="urn:ietf:params:xml:ns:pidf:geopriv10:civicLoc"
   xmlns:gml="urn:opengis:specification:gml:schema-xsd:feature:v3.0"
   xmlns:lt="urn:ietf:params:xml:ns:location-type"
   entity="sip:UserB@example.com">
<tuple id="a1231">
 <status>
  <basic>open</basic>
 </status>
 <op:willingness>
  <op:basic>open</op:basic>
 </op:willingness>
 <op:session-participation>
  <op:basic>open</op:basic>
 </op:session-participation>
 <rpid:status-icon>http://example.com/~my-icons/PoC-Session </rpid:status-icon>
 <op:registration-state>active</op:registration-state>
 <op:barring-state>terminated</op:barring-state>
 <rpid:class>forfriends</rpid:class>
 <op:service-description>
  <op:service-id>org.openmobilealliance:PoC-session</op:service-id>
  <op:version> 1.0 </op:version>
  <op:description>This is the OMA PoC-Session service</op:description>
      </op:service-description>
 <pdm:deviceID>urn:uuid:d27459b7-8213-4395-aa77-ed859a3e5b3a
 </pdm:deviceID>
 <contact>sip:my_name@example.com</contact>
 <timestamp>2005-02-22T20:07:07Z</timestamp>
</tuple>
<tuple id="a1232">
 <status>
  <basic>open</basic>
 </status>
 <op:willingness>
  <op:basic>open</op:basic>
 </op:willingness>
 <rpid:status-icon>http://example.com/~my-icons/CPM-
Interworking</rpid:status-icon>
 <op:registration-state>active</op:registration-state>
 <rpid:class>forfriends</rpid:class>
 <op:service-description>
```

TABLE 1-continued

```
  <op:service-id>org.openmobileallaiance:CPM-User-
Preference</op:service-id>
  <op:version>1.0</op:version>
  <op:description>This is the CRM Interworking User
Preference</op:description>
  <op:Interworking>
  <op:Preference>open</op:Preference>
  <op:Preferred_service>
   <op:Service_type>SMS</op:Service_type>
   <op:Preferred_value>1</op:Preferred_value>
   <op:contact>+821695305938</op:contact>
  </op:Preferred_service>
  <op:Preferred_service>
   <op:Service_type>MMS</op:Service_type>
   <op:Preferred_value>0.5</op:Preferred_value>
   <op:contact>+821695305938</op:contact>
  </op:Preferred_service>
  <op:Preferred_service>
   <op:Service_type>PoC</op:Service_type>
   <op:Preferred_value>0.1</op:Preferred_value>
   <op:contact>sip:PoC-UserB@example.com</op:contact>
  </op:Preferred_service>
  </op:Interworking>
 </op:service-description>
 <pdm:deviceID>urn:uuid:a509f34e-8213-4395-aa77-
ed859a3e5b3a</pdm:deviceID>
 <contact>sip:User@example.com</contact>
 <timestamp>2008-01-15T20:07:07z</timestamp>
</tuple>
```

In Table 1, elements and attributes in the document representing the presence information are as follows. The presence document indicates a user of the presence information using 'entity id' included in a namespace section. In Table 1, it indicates that the presence information is of User B.

<tuple id> serves to identify each service, and <op:service-id> indicates which service User B supports. In Table 1, "a1231" and "a1232" are identification values indicating different messaging services, '<op:service-id>org.openmobilealliance:PoC-Session</op:service-id>' indicates supporting of the PoC service, and '<op:service-id>org.openmobilealliance:CPM-User-Preference</op:service-id>' indicates supporting of the user preference of the CPM service. By linking the two elements <tuple id> and <op:service-id> in this way, it is possible to indicate one service supported by each identifier. Although it is assumed in Table 1 that the presence information includes the PoC service and the CPM service, messaging services such as IM service, MMS and Email may also be added. In this manner, the user's available messaging service may be indicated by <tuple id> and <op:service-id>.

In Table 1, <status> indicates availability, <op:willingness> indicates a user's willingness to use a certain service, and <op:registration-state> indicates whether the user is registered in the service. <op:service-description> is a detailed description of the service corresponding to the identifier. Because the user presence is not included in the PoC service corresponding to "a1231", a CPM-User-Preference service corresponding to "a1232" is described. Sub-elements of <op:service-description> include <op:service-id>, <op:version>, <op:description>, and <op:Interworking>.

<op:service-id> has been described above, and <op:version> represents a version of the service. <op:description> is created by the user or the presence service provider, and serves to show a text informing which presence information this service represents. When the user wants interworking, <op:Interworking> represents the related information using the sub-elements.

If <op:Preference> is open, it means an intention to apply interworking preference, and if <op:Preference> is closed, it means an intention not to apply the interworking preference information. <op:Preferred_service> indicates a type of a messaging service preferred during interworking, and <op: Preferred_value> indicates a priority of a preference when there are various types of preferred messaging services. In Table 1, a messaging service closer to 1 is a messaging service with a higher preference and a messaging service closer to 0 means a messaging service with a lower preference. Therefore, in Table 1, the preferences are shown in order of SMS>MMS>PoC services, which means that during interworking, the user wants to receive messages using SSM at first, and if it is not possible, wants to receive messages using MMS and PoC in order. <op:contact> is contact information indicated by contactable MSISDN, SIP URI or Email address. For meanings of other elements included in the presence information document, reference can be made to OMA Presence.

Names of the above elements are subject to change according to embodiments of the present invention, and the attribute corresponding to each element may be represented by a new element. That is, the aforesaid attributes are not limited to names of their associated elements.

In accordance with another embodiment of the present invention, the presence information may be delivered to the presence server without using the SIP/IP core network. One of them is a method of using a Extensible Messaging and Presence Protocol (XMPP), and another is a method of using a Instant Messaging and Presence Service (IMPS) based on WAP. Even though these two methods are used, the contents of the above-described elements should be included, which are a type of an available messaging service(s) and a user preference during interworking, i.e., messaging services the user desires to use, and a preference degree and contact information for each messaging service.

Storing (publishing) of the presence information can be carried any time, and priorities of receiving transmission message by the CPM server and storing presence information by the user are not specified.

Turning back to FIG. 3, the presence server 160 stores the presence information received from the second terminal 110 in step 203. Thereafter, in step 205, upon user's request, the first terminal 100 generates a message, includes the message in a SIP MESSAGE and transmits the SIP MESSAGE to a SIP/IP core network 210. In step 207, the SIP/IP core network 210, if it is a routing mechanism, for example, an IMS network, delivers the received SIP MESSAGE to the first CPM server 120 using an initial Filter Criteria (iFC).

Upon receiving the SIP MESSAGE, the first CPM server 120 checks a message recipient and then requests the presence server 160 to provide presence information for the recipient in step 209. If the presence server 160 is a SIMPLE presence server based on the SIP/IP core network, the first CPM server 120 requests presence information using a SUBSCRIBE method. If the presence server 160 is not the SIMPLE presence server, the first CPM server 120 may request presence information using a command of a XMPP or WAP protocol. The presence server 160 searches for the requested presence information and transmits the searched presence information to the first CPM server 120 in step 211. The presence server 160 may deliver user's presence information searched only once to an information requestor upon request of the information requestor, or may deliver the user's presence information to the information requestor every time there is a change in the searched user's presence information.

In step 213, the first CPM server 120 decides whether to perform interworking, based on the presence information provided from the presence server 160. The first CPM server 120 decides not to perform interworking, if interworking-related information is not included in the presence information or information indicating that the user does not want interworking is included in the presence information. The first CPM server 120 decides to perform interworking, if interworking-related information is included in the presence information or information indicating that the user wants interworking is included in the presence information.

In step 215, the first CPM server 120 selects a messaging service through which it will perform interworking (hereinafter referred to as a "messaging service for interworking") based on the presence information. For example, if SMS is designated in a user preference of the presence information as a messaging service that the user will use during interworking, the first CPM server 120 selects SMS as a messaging service for interworking. If the messaging service for interworking is selected in this way, the first CPM server 120 transmits a SIP MESSAGE in which a message generated by the first terminal 100 is included, to the SIP/IP core network 210 in step 217.

If the presence information is generated in the form shown in Table 1, an operation of the first CPM server 120 in the process corresponding to steps 213 to 217 may be performed as follows. In accordance with an embodiment of the present invention, the first CPM server 120 first determines whether the CPM server is included in a group of available messaging services. If the CPM service is included in the presence information as an available messaging service, the first CPM server 120 checks a user preference. If no interworking-related element is included in the user preference or no user preference is used, indicating that the message recipient does not want interworking, then the first CPM server 120 transmits the message to a receiving CPM server over the SIP/IP core network, determining that the message recipient does not want interworking.

However, if the CPM service is included in a group of available messaging services, an interworking preference is activated in the user preference, and a preference degree for a specific messaging service is represented by <op:Preferred_value>, then the first CPM server 120 decides to perform interworking. Subsequently, the first CPM server 120 transmits a message to be transmitted to the recipient, to the IWF 140 over the SIP/IP core network 210.

Even though the CPM service is not included in a group of available messaging services, the first CPM server 120 analyzes interworking preference information by checking user preference information in the presence information. If the interworking preference is activated and a preference degree for a specific messaging service is represented by <op:Preferred_value>, then first CPM server 120 decides to perform interworking. The first CPM server 120 transmits a message to be transmitted to the recipient, to the IWF 140 over the SIP/IP core network 210.

If the CPM server is not included in a group of available messaging services and user preference information and interworking preference information cannot be found in presence information, then the first CPM server 120 selects one of available messaging services and transmits information about the selected messaging service to the SIP/IP core network in step 217. Upon receiving a SIP MESSAGE in step 217, the SIP/IP core network 210 transmits the received SIP MESSGE to the IWF 140 in step 219.

Meanwhile, even when the SIP/IP core network 210 transmits the message to the IWF 140, the SIP/IP core network 210 may send the message using various methods. First, methods classified according to the realization of the IWF 140 are as follows.

First, if the IWF 140 exists as an independent entity which is different for each type of a messaging service, the first CPM server 120 should deliver a message to the relevant IWF according to the decided messaging service. A message delivery method may include a method of inserting, into a Request URI in a SIP MESSAGE, an address of the IWF responsible for a messaging service for interworking, rather than a receiving side's SIP URI. When a SIP MESSAGE is generated in a sending side, a recipient address is stored in two places: a Request URI field and a To-Header field. Therefore, after converting the SIP MESSAGE into a desired message format for interworking, the IWF may transmit the To-Header field using a report message.

Another method includes generating a specific tag for interworking, for each messaging service. This tag may be a media feature tag. For example, if the CPM server has decided to perform interworking using MMS, the CPM server inserts a media feature tag such as 'oma.cpm-interworking.mms' into an Accept Contact Header field in the SIP MESSAGE, and sends it to the SIP/IP core network, and then the SIP/IP core network sends this message to the IWF responsible for MMS by means of a set routing mechanism.

Further another method may include a method of delivering a message by setting a CPM server so that it may directly deliver a message to the IWF. For example, if an IP address specific to each IWF is known, messages can be delivered not through the SIP, but through the IP.

Meanwhile, if one IWF exists as one entity with respect to all messaging services, a CPM server includes in a message an indicator indicating which messaging service it will use, and then transmits the message using an address assigned to the IWF. In this manner, the IWF may convert a message format and transmit the converted message.

If there is no address assigned to the IWF, the above-described media feature tag may be applied. If the CPM server transmits a message including a media feature tag to the SIP/IP cover network, the SIP/IP cover network may recognize that it should send this message to the IWF using the media feature tag. Accordingly, if the SIP/IP core network transmits a received message, the IWF determines with which messaging service the interworking is performed, using the media feature tag.

The IWF 140, which has received a message using one of the above methods, converts the SIP MESSAGE into a desired message format for interworking based on the above decision criteria in step 221.

In the case of the PoC service and IM service providing services based on the SIP/IP core network, the IWF converts information for routing, rather than converting a media format of the message to be actually transmitted. For example, assuming that the CPM service uses a CPM feature tag, for routing, if the IWF converts the CPM feature tag into a PoC feature tag or an IM feature tag, the message is transmitted from a sending SIP/IP core network to a receiving SIP/IP core network and then delivered to a recipient terminal over an application server responsible for the PoC service and IM service. This process corresponds to steps 223, 225, 227, 229 and 231 in FIG. 3.

As for other services, such as SMS, MMS and Email, which do not provide services based on the IP/IP core network, the IWF converts a SIP MESSAGE so as to be suitable for media format conversion and a transport protocol and then transmits the converted message over a network, for example, an IP network and an ATM network, which are not based on the SIP. Then the message is transmitted to a receiving terminal over an application server (SMS, MMS and Email servers) responsible for the relevant service. That is, in FIG. 3, after step 221, steps 241 and 243 represented by a dotted line are performed.

Figure 4:
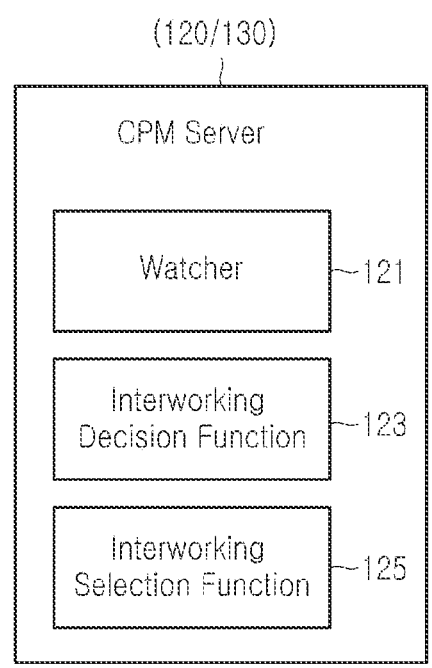
FIG. 4 is a diagram showing a structure of a CPM server according to an embodiment of the present invention.

FIG. 4 shows a structure of the CPM server 120 (130) according to an embodiment of the present invention. The CPM server 120 (130) includes a watcher 121 capable of acquiring and analyzing presence information, an interworking decision function 123 for deciding whether to perform interworking, based on the acquired presence information, and an interworking selection function 125 for selecting through which messaging service it will perform interworking, based on the type of an available messaging service and the user preference, in the acquired presence information.

In the aforesaid embodiment of the present invention, the CPM server 120 (130) should include all of the above function units, but in an alternative embodiment, the IWF 140 may be adapted to acquire the presence information. In this case, the IWF 140 may include the watcher 121, the interworking decision function 123, and the interworking selection function 125, or may be adapted to perform operations related to the respective function units. In this case, a method for transmitting a message converted by interworking may be similar to a process in which the CPM server acquires presence information and transmits it over the IWF.

Figure 5:
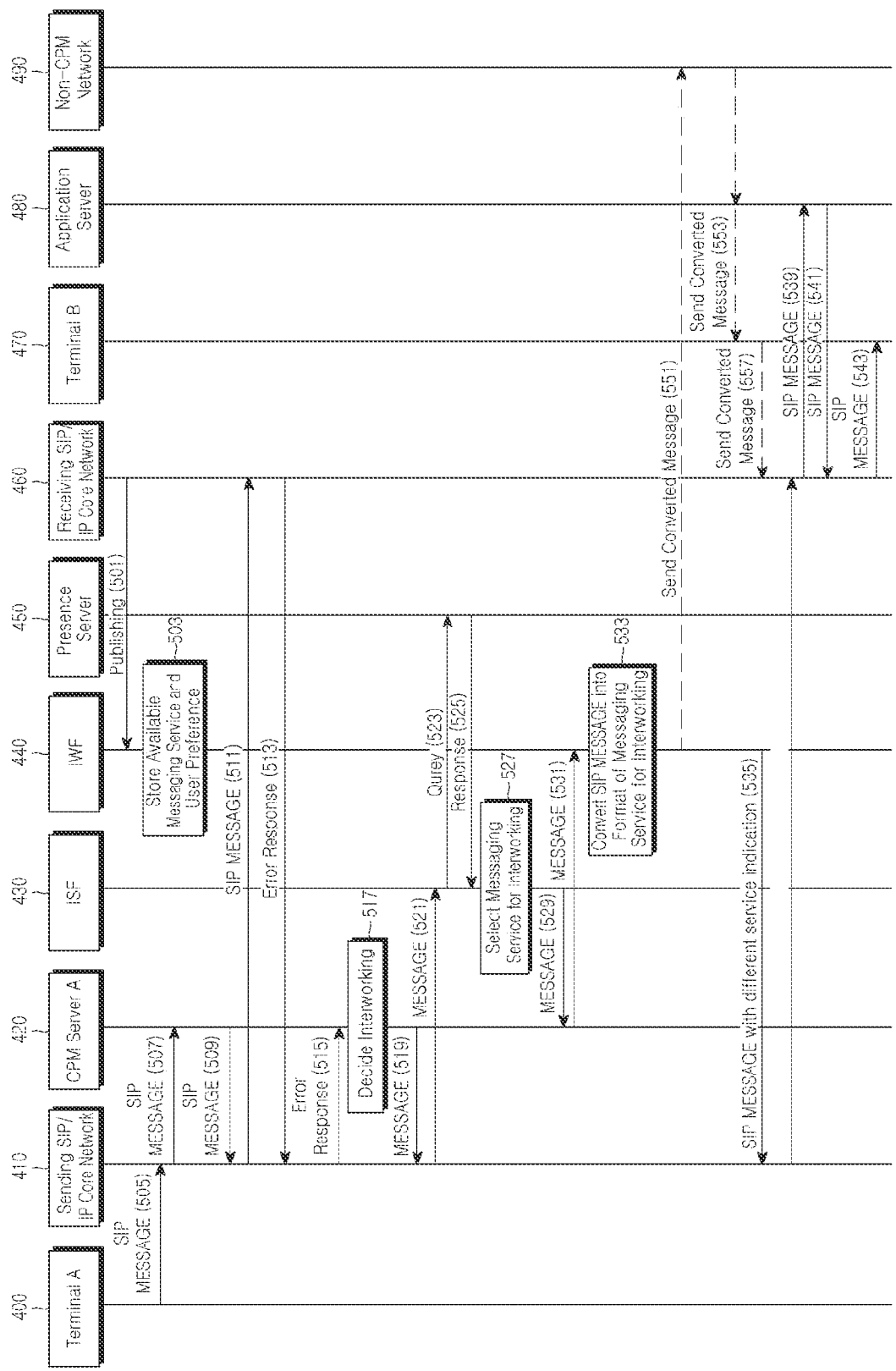
FIG. 5 is a diagram showing an interworking process according to another embodiment of the present invention.

Meanwhile, reference will now be made to FIG. 5 to make a description of a message transmission process in the case where a function unit, i.e., the interworking selection function 125, for selecting a messaging service for interworking based on user preference stored in the presence server 160, is realized as a separate server according to another embodiment of the present invention. In FIG. 5, an independent server for the interworking selection function 125 is an ISF 430.

In an embodiment of FIG. 5, steps 501 and 503 in which a user of a terminal B 470 stores in a presence server 450 his or her available messaging service and user preference information for interworking using the terminal B 470, are equal to steps 201 and 203 described in FIG. 3.

In step 505, a terminal A 400 generates a message using a SIP MESSAGE method and transmits the message to a SIP/IP core network A 410. The SIP/IP core network A 410, if it is a routing mechanism, for example, a 3GPP IMS network, delivers the message to a CPM server A 420 using an iFC in step 507. Upon receiving the message, the CPM server A 420 checks a recipient to receive the message and then transmits it to a SIP/IP core network B 460 if routing is possible in the SIP/IP core network A 410, in steps 509 and 511. The SIP/IP core network B 460 determines which service the received SIP MESSAGE supports, and sends an Error response to the SIP/IP core network A 410 in step 513, if the service is not supported in the network. Upon receiving the message, the SIP/IP core network A 410 delivers the Error response to the CPM server A 420 in step 515. Otherwise, after step 509, if routing is not possible for some reason that for example, the recipient address does not support the SIP protocol, the SIP/IP core network A 410 sends an Error Response to the CPM server A 420, skipping steps 511 and 513.

Upon receiving the Error response, the CPM server A 420 decides interworking in step 517, recognizing that the receiving-side user does not support the CPM service, and transmits a message to the SIP/IP core network A 410 in step 519. The SIP/IP core network A 410 transmits the message to the ISF 430 in step 521. When being transmitted to the ISF 430, the message may be routed using the iFC, or may be transmitted through an interface between the CPM server A 420 and the ISF 430. Upon receiving the message, the ISF 430 requests the presence server 450 to provide an available messaging service and presence information of the receiving-side user in step 523, in order to query which messaging service the receiving-side user uses. Upon the request, the presence server 450 searches for related information and transmits a response to the ISF 430 in step 525. The ISF 430 selects a messaging service through which it will send a message, based on the presence information received from the presence server 450, in step 527, and transmits a message to the CPM server A 420 in step 529. The CPM server A 420 transmits the message to the IWF 440 in step 531. When transmitting the message to the IWF 440, the CPM server A 420 may perform routing using the iFC, or may directly transmit the message through an interface between the ISF 430 and the IWF 440. Upon receiving the message from the ISF 430, the IWF 440 converts the message according to the type of the selected messaging service in step 533. The converted message is transmitted to the terminal B 470 according to steps 535 to 543, or steps 551 and 553, which are similar to steps 223 to 231, or steps 241 and 243 of FIG. 3.

As described above, embodiments of the present invention provide a method for performing interworking taking into account the presence/absence of a user's interworking request and a type of a messaging service through which interworking will be performed, thereby providing a more efficient messaging service to the user.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for performing interworking between different messaging services in a Converged Internet Protocol (IP) Messaging (CPM) service, the method comprising:
   receiving, by a CPM server, a message generated based on a user input from an arbitrary terminal;
   requesting, by the CPM server, a presence server to provide presence information corresponding to a recipient of the message;
   receiving, from the presence server, the presence information that is transmitted in response to the request;
   deciding a type of a messaging service for interworking based on the presence information; and
   delivering, by the CPM server, the message to an Interworking Function (IWF) that converts the message according to the decided type of the messaging service.

2. The method of claim 1, wherein the presence information includes a type of a messaging service supportable by a user corresponding to the presence information, a grant/non-grant of messaging interworking, a type of a messaging service preferred during interworking, and a priority of a preference.

3. The method of claim 2, wherein the presence information is determined by the user, and registered in the presence server.

4. The method of claim 2, wherein the presence information includes a message receiving address corresponding to each of the messaging services preferred during interworking.

5. The method of claim 1, wherein deciding the type of the messaging service for interworking comprises:
   checking the presence information; and
   delivering the message to the recipient, if a CPM service is included in the presence information as a messaging service available to the recipient and interworking-related information for the message is not included or not activated in the presence information.

6. The method of claim 1, further comprising determining to perform interworking for the message, if interworking-related information for the message is activated in the presence information,
   wherein deciding the type of the messaging service for interworking based on the presence information comprises deciding the type of the messaging service for interworking according to a type of a messaging service preferred during interworking and a priority of a preference, which are included in the presence information.

7. The method of claim 1, wherein the IWF corresponds to the type of the messaging service, and
   wherein the message is included in a Session Initiation Protocol (SIP) MESSAGE.

8. The method of claim 7, wherein delivering the message according to the decided type of the messaging service comprises:
   inserting, by the CPM server, an address of a specific IWF corresponding to the decided type of the messaging service instead of an SIP URI of the recipient, into a Request URI in the SIP MESSAGE; and
   delivering the message to the specific IWF over an SIP/IP core network, and
   wherein upon receiving the SIP MESSAGE, the specific IWF converts the SIP MESSAGE into a format of a desired messaging service for interworking, and delivers the converted message to the recipient based on a To-Header field in the SIP MESSAGE.

9. The method of claim 7, wherein delivering the message according to the decided type of the messaging service comprises:
   generating, by the CPM server, a media feature tag corresponding to the decided type of the messaging service;
   inserting the media feature tag into the SIP MESSAGE; and
   delivering the SIP MESSAGE to a specific IWF corresponding to the decided type of the messaging service over an SIP/IP core network, and
   wherein upon receiving the SIP MESSAGE, the specific IWF converts the SIP MESSAGE into a format of a desired messaging service for interworking and delivers the converted message to the recipient.

10. The method of claim 7, wherein delivering the message according to the decided type of the messaging service comprises:
    directly delivering the message to a specific IWF using an IP address of the specific IWF corresponding to the decided type of the messaging service.

11. The method of claim 1, further comprising delivering an indicator indicating the decided type of the messaging service to the IWF.

12. The method of claim 1, wherein the CPM server is included in an SIP/IP core network, and
    wherein if the decided messaging service is based on the SIP/IP core network, the IWF converts only routing information of the message, and if the decided messaging service is a service based on a non-SIP/IP core network, the IWF converts a media format of the message according to the decided messaging service and converts the message according to a transport protocol of the decided messaging service.

13. A Converged Internet Protocol (IP) Messaging (CPM) server for performing interworking between different messaging services in a CPM service, the CPM server comprising:
  a transceiver for transmitting and receiving messages; and
  a controller for receiving a message generated based on a user input from an arbitrary terminal via the transceiver, requesting a presence server to provide presence information corresponding to a recipient of the message, receiving the presence information that is transmitted from the presence server in response to the request via the transceiver, deciding a type of a messaging service for interworking based on the presence information, and delivering, via the transceiver, the message to an Interworking Function (IWF) that converts the message according to the decided type of the messaging service.

14. The CPM server of claim 13, wherein the presence information comprises a type of a messaging service supportable by a user corresponding to the presence information, a grant/non-grant of messaging interworking, a type of a messaging service preferred during interworking, and a priority of a preference.

15. The CPM server of claim 14, wherein the presence information is determined by the user, and registered in the presence server.

16. The CPM server of claim 14, wherein the presence information comprises a message receiving address corresponding to each of the messaging services preferred during interworking.

17. The CPM server of claim 13, wherein the controller checks the presence information and delivers the message to the recipient, if a CPM service is included in the presence information as a messaging service available to the recipient and interworking-related information for the message is not included or not activated in the presence information.

18. The CPM server of claim 13, wherein the controller determines to perform interworking for the message, if interworking-related information for the message is activated in the presence information, and decides the type of the messaging service for interworking according to a type of a messaging service preferred during interworking and a priority of a preference, which are included in the presence information.

19. The CPM server of claim 13, wherein the IWF corresponds to the type of the messaging service, and the message is included in a Session Initiation Protocol (SIP) MESSAGE.

20. The CPM server of claim 19, wherein when delivering the message according to the decided type of the messaging service, the controller inserts an address of a specific IWF corresponding to the decided type of the messaging service instead of an SIP URI of the recipient, into a Request URI in the SIP MESSAGE, and delivers the message to the specific IWF over an SIP/IP core network, and
  wherein upon receiving the SIP MESSAGE, the specific IWF converts the SIP MESSAGE into a format of a desired messaging service for interworking, and delivers the converted message to the recipient based on a To-Header field in the SIP MESSAGE.

21. The CPM server of claim 19, wherein when delivering the message according to the decided type of the messaging service, the controller generates a media feature tag corresponding to the decided type of the messaging service, inserts the media feature tag into the SIP MESSAGE, and delivers the SIP MESSAGE to a specific IWF corresponding to the decided type of the messaging service over a SIP/IP core network, and
  wherein upon receiving the SIP MESSAGE, the specific IWF converts the SIP MESSAGE into a format of a desired messaging service for interworking and delivers the converted message to the recipient.

22. The CPM server of claim 19, wherein when delivering the message according to the decided type of the messaging service, the controller directly delivers the message to a specific IWF using an IP address of the specific IWF corresponding to the decided type of the messaging service.

23. The CPM server of claim 13, wherein the controller delivers an indicator indicating the decided type of the messaging service to the IWF.

24. The CPM server of claim 13, wherein the CPM server is included in an SIP/IP core network, and
  wherein if the decided messaging service is based on the SIP/IP core network, the IWF converts only routing information of the message, and if the decided messaging service is a service based on a non-SIP/IP core network, the IWF converts a media format of the message according to the decided messaging service and converts the message according to a transport protocol of the decided messaging service.

25. A method for exchanging messages between different messaging services in a Converged Internet Protocol (IP) Messaging (CPM) service, the method comprising:
  generating, by a terminal, presence information of the terminal;
  transmitting, by the terminal, the presence information to a presence server; and
  receiving, by the terminal, a converted message from an Interworking Function (IWF),
  wherein the converted message is converted at the IWF based on a type of messaging service selected according to the presence information.

26. The method of claim 25, wherein the presence information includes a type of a messaging service supportable by a user corresponding to the presence information, a grant/non-grant of messaging interworking, a type of a messaging service preferred during interworking, and a priority of a preference.

27. A terminal for exchanging messages between different messaging services in a Converged Internet Protocol (IP) Messaging (CPM) service, the terminal comprising:
  a transceiver for transmitting and receiving messages; and
  a controller for generating presence information of the terminal, transmitting the presence information to a presence server via the transceiver, and receiving a converted message from an Interworking Function (IWF), via the transceiver,
  wherein the converted message is converted at the IWF based on a type of messaging service selected according to the presence information.

28. The terminal of claim 27, wherein the presence information comprises a type of a messaging service supportable by a user corresponding to the presence information, a grant/non-grant of messaging interworking, a type of a messaging service preferred during interworking, and a priority of a preference.

* * * * *